US010336928B2

(12) United States Patent
Chen et al.

(10) Patent No.: US 10,336,928 B2
(45) Date of Patent: Jul. 2, 2019

(54) CORROSION INHIBITED COMPOSITIONS AND METHODS OF USING SAME

(71) Applicant: Dober Chemical Corporation, Woodridge, IL (US)

(72) Inventors: Yu-Sen Chen, Naperville, IL (US); Dennis Kelly, LaPorte, IN (US); Scott Smith, Naperville, IL (US)

(*) Notice: Subject to any disclaimer, the term of this patent is extended or adjusted under 35 U.S.C. 154(b) by 171 days.

(21) Appl. No.: 14/879,504

(22) Filed: Oct. 9, 2015

(65) Prior Publication Data

US 2016/0102233 A1  Apr. 14, 2016

Related U.S. Application Data

(60) Provisional application No. 62/062,313, filed on Oct. 10, 2014.

(51) Int. Cl.
| | |
|---|---|
| *C09K 5/00* | (2006.01) |
| *C09K 5/10* | (2006.01) |
| *C23F 11/12* | (2006.01) |
| *C23F 11/14* | (2006.01) |
| *C23F 11/16* | (2006.01) |
| *C23F 11/18* | (2006.01) |
| *C23F 11/08* | (2006.01) |
| *C09K 5/20* | (2006.01) |

(52) U.S. Cl.
CPC ............... *C09K 5/10* (2013.01); *C09K 5/20* (2013.01); *C23F 11/08* (2013.01); *C23F 11/124* (2013.01); *C23F 11/126* (2013.01); *C23F 11/149* (2013.01); *C23F 11/165* (2013.01); *C23F 11/181* (2013.01); *C23F 11/185* (2013.01)

(58) Field of Classification Search
None
See application file for complete search history.

(56) References Cited

U.S. PATENT DOCUMENTS

| | | | |
|---|---|---|---|
| 4,382,008 A | 5/1983 | Boreland et al. | |
| 4,390,439 A | 6/1983 | Schwartz et al. | |
| 4,448,702 A | 5/1984 | Kaes | |
| 4,578,205 A | 3/1986 | Yeakey et al. | |
| 4,588,513 A | 5/1986 | Triebel et al. | |
| 4,647,392 A | 3/1987 | Darden et al. | |
| 4,851,145 A | 7/1989 | Van Neste et al. | |
| 4,873,011 A | 10/1989 | Jung et al. | |
| 4,946,616 A | 8/1990 | Falla et al. | |
| 5,741,436 A | 4/1998 | Gershun et al. | |
| 6,733,687 B1 * | 5/2004 | Hudgens | C09K 5/10 252/380 |
| 6,802,988 B1 * | 10/2004 | Wenderoth | C23F 11/08 252/180 |
| 2014/0119983 A1 * | 5/2014 | Yang | C09K 5/10 422/7 |

FOREIGN PATENT DOCUMENTS

| | | |
|---|---|---|
| CA | 1142744 A | 3/1986 |
| EP | 0478470 A1 | 4/1992 |

* cited by examiner

*Primary Examiner* — Necholus Ogden, Jr.
(74) *Attorney, Agent, or Firm* — Carlos A. Fisher; Stout, Uxa & Buyan, LLP

(57) ABSTRACT

New compositions, for example, corrosion inhibited compositions, and the like compositions and new methods of using such compositions are disclosed. Such compositions may be liquid solutions, for example, substantially without solid material formation and/or crystal formation, and may include different concentrations of organic acid components and/or different combinations of organic acid components relative to previous compositions. The present compositions may be used as antifreeze coolant compositions or formulations, for example, in the cooling systems of internal combustion engines.

20 Claims, No Drawings

CORROSION INHIBITED COMPOSITIONS AND METHODS OF USING SAME

RELATED APPLICATIONS

This application claims the benefit of U.S. Provisional Application Ser. No. 62/062,313, filed Oct. 10, 2014, the disclosure of which is hereby incorporated in its entirety herein by this reference.

FIELD OF THE INVENTION

The present invention relates to corrosion inhibited compositions, and to methods of using such compositions.

BACKGROUND OF THE INVENTION

Corrosion has long been a problem when certain metals or alloys are used in applications in which they come into contact with an aqueous medium. For example, in heat-transfer, e.g., cooling, systems, such as those found in internal combustion engines, alcohol-based heat transfer fluids (e.g., antifreeze compositions or components) can be very corrosive to the metal surfaces of the heat-transfer, for example, cooling, systems. Compounding this problem, the corrosion is accelerated at normal engine operating conditions, for example, including elevated temperatures. Aluminum surfaces are particularly susceptible to corrosion. See, Darden et al., "Monobasic/Diacid Combination as Corrosion Inhibitors in Antifreeze Formulations," Worldwide Trends in Engine Coolants, Cooling System Materials and Testing, SAE Int'l SP-811, Paper #900804, pp. 135-51 (1990) ("SAE SP-811").

Corrosion inhibitors have been used to address or at least mitigate against these problems. For example, triazoles, thiazoles, borates, silicates, phosphates, benzoates, nitrates, nitrites and molybdates have been used in antifreeze formulations. See, for example, U.S. Pat. No. 4,873,011; and SAE SP-811 at pp. 135-138, 145-46. However, such corrosion inhibitors may have several problems, including high cost, and/or provide inadequate long-term protection against corrosion. See U.S. Pat. Nos. 4,946,616; 4,588,513; and SAE SP-811, pp. 137-38. Also, most of the above-noted inhibitors are metal-specific and, as such, require multi-component formulations making them more difficult and more expensive to prepare and use commercially. See Canadian Patent No. 1,142,744.

Organic acids, such as mono- and/or di-carboxylic acids, have also been used as corrosion inhibitors. For example, see U.S. Pat. No. 4,382,008 (combination of $C_7$-$C_{13}$ dicarboxylic acid and conventional corrosion inhibitors); U.S. Pat. No. 4,448,702 (di-carboxylic acids having 3 or more carbons); U.S. Pat. Nos. 4,647,392 and 4,851,145 (combination of monobasic and dibasic acids); and U.S. Pat. No. 4,946,616 (combination of $C_{10}$ and $C_{12}$ diacids).

Organic acid technology (OAT) coolants use one or more organic acids as the corrosion inhibitors. Such coolants protect engine surfaces through one or more different mechanisms relative to conventional coolants including inorganic inhibitors.

Previous organic acid technology coolants have a number of problems. For example, high concentrations of organic acids, for example, much higher concentrations than concentrations of inhibitors in conventional coolants, may need to be used in organic acid technology (OAT) based coolants to provide the desired degree of corrosion protection, especially for heavy duty applications. Also, one organic acid, sebacic acid, which is used in several commercial antifreeze compositions, e.g., Texaco's "Havoline" Extended Life AntiFreeze/Coolant; General Motors' "Dex-Cool" Anti-Freeze/Coolant; Canadian Tire's "Motomaster" Long Life and is currently used in the standard formulation set forth by the British Military (see Specification TS 10177, "Antifreeze, Inhibited Ethanediol, AL-39"), is difficult to use commercially since it is commercially available as a solid, and requires heat to dissolve it in a heat transfer fluid. Further, sebacic acid and higher di-carboxylic acids tend to have poor solubility in antifreeze formulations, for example, using hard water. See U.S. Pat. No. 4,578,205.

In addition, certain organic acids have been shown to be aggressive towards polymeric components, such as seals, hoses, etc., of cooling systems. Such aggressiveness may result in substantial costs to repair and even replace all or part of the cooling system. Also, organic acids may cause coolant turbidity and/or instability which may create operational issues, such as the need to more frequently service the cooling system and/or replace the coolant. Such service/replacement disadvantageously increase operation costs and equipment downtime.

European Patent Publication No. 0479470A1 relates to corrosion inhibitors having at least one acid having the following general structure:

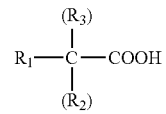

wherein the groups $R_1$, $R_2$ and $R_3$ are the same or different $C_1$-$C_{10}$ alkyls, or, alternately, wherein one of $R_1$, $R_2$ and $R_3$ is H, and the other two R groups are $C_1$-$C_{10}$ alkyls. However, this publication does not disclose any specific combination of mono-carboxylic acids and does not disclose, teach or suggest which combinations of acids would be useful. In fact, the only multi-acid combinations disclosed include sebacic acid, which, as previously discussed, has several disadvantages.

U.S. Pat. No. 4,851,145 discloses a corrosion inhibitor for use in aqueous and liquid alcohol compositions including combinations of an alkylbenzoic acid or salt thereof; a $C_8$-$C_{12}$ aliphatic monobasic acid or salt thereof; and a hydrocarbyl triazole. An additional, optional corrosion inhibitor in the form of a $C_8$-$C_{12}$ aliphatic dibasic acid or salt thereof may be employed.

Corrosion inhibitors containing neodecanoic acid (a mono-carboxylic organic acid) have also been suggested. U.S. Pat. No. 4,390,439 ("Schwartz et al.") relates to the use of neodecanoic acid as a corrosion inhibitor in hydraulic fluids. However, Schwartz et al. does not disclose, teach or suggest other organic acids (except benzoic acid) used alone or in combination with neodecanoic acid as a corrosion inhibitor.

SAE SP-811 also describes neodecanoic acid as a possible corrosion inhibitor. However, SAE SP-811 relates to the use of combinations of mono-carboxylic acids and di-carboxylic acids, including sebacic acid, as corrosion inhibitors. Although SAE SP-811 suggests that neodecanoic acid is effective as a corrosion inhibitor, it states that "[t]he use of neodecanoic acid is limited by solubility considerations . . . " (p. 147).

Thus, it would be desirable to provide new compositions useful in OAT coolants and methods for making such compositions and OAT coolants, for example, that are relatively easy, and operationally and cost effective to use and practice.

SUMMARY OF THE INVENTION

New compositions, for example, corrosion inhibited compositions, and the like compositions and new methods of using such compositions have been discovered. Such compositions may be liquid solutions, for example, substantially without solid material formation and/or crystal formation, and may include different concentrations of organic acid components and/or different combinations of organic acid components relative to previous compositions. The present compositions may be used as antifreeze compositions or antifreeze coolant compositions, for example, in the cooling systems of internal combustion engines.

The term "antifreeze" or "antifreeze composition" as used herein includes freeze point depressant concentrates, for example, compositions included about 75% to about 95% by weight of freeze point depressant.

The term "coolant" or "coolant composition" as used herein includes premix, ready to use coolants in which a freeze point depressant is present in a range of 0% to about 70% by weight of the composition.

In one example, the present corrosion inhibited compositions comprise a liquid component, for example, a major amount of a liquid component, selected from water, at least one freezing point depressant and mixtures thereof; a t-butyl benzoic acid component in an amount range of about 1000 mg/L (milligrams per liter) to about 30,000 mg/L or about 35,000 mg/L; an azelaic acid component in an amount in a range of about 500 mg/L to about 12,500 mg/L or about 15,000 mg/L; and an aromatic triazole component in an amount in a range of about 100 mg/L to about 3500 mg/L. In one example, the pH of the composition may be at least about 7, for example, in a range of about 8 to about 11.

In one example, the present composition includes a liquid component containing 50 volume percent of water and 50 volume percent of at least one freezing point depressant, and the composition has a freeze point of at least −36.4° C. In other words, in one example, the present compositions may provide a finished antifreeze composition which meets the ASTM standard D3306 freeze point by the ASTM D1177 method.

In one example, the present composition is formulated so that each of the t-butyl benzoic acid component, the azelaic acid component and the aromatic triazole component is soluble, for example, substantially totally soluble, in the composition at room temperature. Thus, the present composition may be a solution.

The present compositions may be more compatible with (less aggressive to) polymeric, for example, elastomeric, components of cooling systems in which the composition is employed relative to a reference composition, for example, a substantially similar composition including, in addition, an amount, for example, at least about 100 mg/L or about 200 mg/L, of a $C_8$-$C_{12}$ aliphatic monobasic acid. In one example, the present composition is substantially free of a $C_8$-$C_{12}$ aliphatic monobasic acid component, e.g., a $C_8$-$C_{12}$ aliphatic monobasic acid, or an alkali metal, ammonium, or amine salt thereof.

In one example, the present compositions may further comprise at least one additional $C_6$-$C_{12}$ hydrocarbonyl dibasic acid component present in an amount less than the amount of the azelaic acid component. For example, the additional $C_6$-$C_{12}$ hydrocarbonyl dibasic acid component may be selected from the group consisting of pimelic acid, adipic acid, suberic acid, sebacic acid, undodecanedioic acid, dodecanedioic acid and the like and mixtures thereof. In one example, of the $C_6$-$C_{12}$ hydrocarbonyl dibasic acid components present in the present compositions, the azelaic acid component is a major portion, that is at least about 50% by weight, of such $C_6$-$C_{12}$ dibasic hydrocarbonyl acid components. In one example, the azelaic acid component is the only $C_6$-$C_{12}$ dibasic hydrocarbonyl acid component in the present compositions.

The present compositions may have and/or provide one or more advantages and/or benefits relative to other, for example, prior art, corrosion inhibited compositions. In one example, when a composition in accordance with the present invention is employed as a coolant composition in a cooling system, the coolant advantageously exhibits improved clarity (reduced turbidity) relative to a reference coolant which is the composition of the present invention including a $C_8$-$C_{12}$ aliphatic monobasic acid. In one example, the present compositions are free of $C_8$-$C_{12}$ aliphatic monobasic acid or acids.

The present compositions advantageously may be substantially less aggressive, for example, substantially non-aggressive, toward substantially hydrocarbon elastomers (polymers) used in at least one polymeric component of a cooling system in sustained contact with the composition.

In one example, the aromatic triazole component is selected from the group consisting of benzotriazole, mercaptobenzothiazole, tolyltriazole and mixtures thereof. Benzotriazole may be employed alone or with other aromatic trizole components in the present compositions.

The present compositions may further comprise an effective amount of at least one metal-containing inhibitor component, for example, at least one metal-containing corrosion inhibitor component. Examples of such metal-containing inhibitor components include, without limitation, one or more of $Na_2MOO_4$, $NaNO_3$ and mixtures thereof. In one example, the present compositions include at least one metal-containing inhibitor component in an amount in a range of about 100 mg/L to about 3000 mg/L of the composition.

The present compositions may include one or more additional components, for example, one or more surfactants, deformers, dyes, scale inhibitors and mixtures thereof. Such additional component or components may be included in the present compositions in an amount effective to provide a desired or useful property to the composition.

Such metal-containing inhibitor component(s) and/or additional component(s) may be included in the present compositions in effective amount(s) and without unduly interfering with the usefulness or utility of the present composition(s).

The t-butyl benzoic acid component may be present in the compositions as the acid or as a salt, e.g., alkali metal salts, ammonium salts, amine salts and mixtures thereof. The t-butyl benzoic acid component may include one or more of para t-butyl benzoic acid, meta t-butyl benzoic acid, ortho t-butyl benzoic acid and mixtures thereof.

The azelaic acid component may be present in the compositions as the acid or as a salt, e.g., alkali metal salts, ammonium salts, amine salts and mixtures thereof.

In one example, the present compositions are substantially free of a $C_8$-$C_{12}$ aliphatic monobasic acid component. Aliphatic monobasic acids have been shown to be chemically aggressive to elastomers used in cooling systems (hoses and gasket material). Silicone hoses and gaskets are used in higher prevalence today as bulk coolant temperatures are increasing due to the evolution and advancements in engine design. Aliphatic monobasic acids, like 2-ethylhexanoic acid (2EHA) and neodecanoic acid, are particularly aggressive to silicone. The present compositions may be less aggressive toward, or substantially non-aggressive toward, substantially hydrocarbon elastomers used in at least one component of a cooling system in sustained contact with the composition relative to a substantially identical composition including, in addition, an amount, for example, at least 0.1 percent by weight of a $C_8$-$C_{12}$ aliphatic monobasic acid or the alkali metal, ammonium or amine salt thereof. $C_8$-$C_{12}$ aliphatic monobasic acids and the alkali metal, ammonium and amine salts thereof are advantageously not included in the present compositions.

The ratio of t-butyl benzoic acid component to azelaic acid component to aromatic triazole component in the present compositions may be selected to provide an effective composition. In one example, the amounts of the acid components together are greater than the amount of aromatic triazole component.

The amount of t-butyl benzoic acid component may be greater than, equal to or less than the amount of azelaic acid component.

The amount of each of the components of the present compositions may be chosen to provide useful or effective or superior results in the particular application involved.

Any suitable freezing point depressant component may be employed. The freezing point depressant component may be organic. In one example, the freezing point depressant component comprises at least one alcohol. The at least one alcohol may be any suitable alcohol useful to depress the freezing point temperature of an aqueous liquid. For example, and without limitation, the at least one alcohol may be selected from the group consisting of methanol, ethanol, propanol, ethylene glycol, diethylene glycol, trimethylene glycol, propylene glycol, dipropylene glycol, butylene glycol, glycerol, the monoethylether of glycerol, the dimethylether of glycerol, alkoxy alkanols, and the like and mixtures thereof.

In one example, the liquid medium may be present in the composition in a major amount, that is at least about 50% by weight, for example, at least about 70% or at least about 90% or more, by weight.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

DETAILED DESCRIPTION OF THE INVENTION

The present invention relates to corrosion inhibited compositions including two or more organic acid components, which are effective for use as coolants to provide effective cooling and to provide prolonged corrosion protection in cooling systems, for example, such as found in, or coupled to, internal combustion engines.

The present compositions may include organic acid components and other components useful to make an organic acid technology (OAT) coolant in soluble form which is easy or straightforward to use. For example, the present compositions may be soluble, that is may be solutions. The solubility characteristics of the present compositions, together with effective corrosion inhibition and other properties, for example, reduced aggressiveness toward polymeric components in cooling systems and reduced turbidity, for example, compared to other, prior art coolants, are highly advantageous.

The present compositions may be used directly as a coolant or can be combined with an aqueous liquid to provide a final use composition that is an antifreeze formulation or actual coolant, for example, used in a cooling system, such as a cooling system associated with an internal combustion engine. The present compositions can be used in either heavy duty or light duty coolants, with the make-up of the composition being adjusted according to whether a heavy duty or a light duty application is involved.

The mixing of the various components of the compositions in accordance with the present invention may occur, as evident to a person of skill in the art, in any suitable or appropriate mixing system, for example, including a vessel, such as a vat or a tank, with mixing/blending carried out by agitation and/or mixing, for example, using one or more mixers, e.g., overhead mixers.

In one example, the present composition has a pH of greater than 7, or at least about 8 or in a range of about 8 to about 11, and provides increased solubility of the acid components and the aromatic triazole component in the composition relative to a substantially identical composition wherein the pH is less than 7.

The source of alkalinity for the present compositions, if any, may be any source of alkalinity that is compatible with the other components of the composition and that provides the composition with the desired pH.

Exemplary sources of alkalinity include, without limitation, alkali metal hydroxides, alkali metal salts, silicates, phosphates, amines, and mixtures thereof. Exemplary alkali metal hydroxides include, without limitation, sodium hydroxide, potassium hydroxide, and lithium hydroxide. The alkali metal hydroxides may be added to the composition in a variety of forms. Alkali metal hydroxides are commercially available as aqueous solutions, for example, as solutions including 45% by weight, 50% by weight or 73% by weight alkali metal hydroxide.

Exemplary alkali metal salts include, without limitation, sodium carbonate, trisodium phosphate, potassium carbonate, and mixtures thereof. Exemplary silicates include, without limitation, sodium metasilicates, sesquisilicates, orthosilicates, potassium silicates, and mixtures thereof. Exemplary phosphates include, without limitation, sodium pyrophosphate, potassium pyrophosphate, and mixtures thereof. Exemplary amines include, without limitation, alkanolamine. Exemplary alkanolamines include, without limitation, triethanolamine, monoethanolamine, diethanolamine, and mixtures thereof.

The source of alkalinity is provided in an amount sufficient to provide the composition with a pH of 7 or above, for example, at least about 8. The composition may have a pH in a range of about 8.0 and about 11, or in a range of between about 8.0 and about 9.5.

The present compositions may comprise an effective amount of one or more additional components, such as anti-foaming agents, dyes, pH buffers, scale inhibitors, surfactants, sequestration agents, dispersion agents, and the like and mixtures thereof.

In one example, the compositions of this invention may also include an effective amount of one or more additional corrosion inhibitors, such as thiazoles, alkali metal phosphates, borates, silicates, benzoates, nitrates, nitrites, molybdates and mixtures thereof.

Examples of other components which may be included in the compositions include, without limitation, anti-foaming agents, e.g., polyglycol copolymers, such as Dow 112-2 from Dow Chemical Company, PM-5150 from Union Carbide Corp., Pluronic L-61 from BASF Corp., and Patco 492 and Patco 415 from American Ingredients Company; dyes, e.g., Alizarine Green, Uranine Yellow and Green AGS-liquid from Abbey Color Inc., and Orange II (Acid Orange 7) and Intracid Rhodamine WT (Acid Red 388) from Crompton & Knowles Corp.; pH buffers; scale inhibitors, such as the Aquatreat terpolymer products AR545, AR540, AR900A, AR980 and AR802, and Versaflex products from Akzo-Nobel; polyacrylate homopolymers, such as T5000N from Telomer Corporation; sequestration and dispersion agents, e.g., Dequest from Monsanto Chemical Company, Bayhibit from Miles Inc., NalPREP from Nalco Chemical Company; surfactants and coupling agents, such as TP4-LF from Dow Chemical Company; hydrotropes, such as xylene sulfonates, e.g., sodium xylene sulfonate, ammonium xylene sulfonate and sodium dimethylbenzenesulfonate; and the like and mixtures thereof.

Other additives, for example, such as chelants, may also be added in order to stabilize the corrosion inhibitor components in the composition. The stabilization property of the chelant may be pH dependant. Examples of chelants include ethanol diglycide disodium salt (EDG), ethylene diamine tetraacetic acid (EDTA) and its salts or mixtures thereof, mono and dicarboxylic acids such as, for example, citric acid, tartaric acid, their salts and mixtures thereof, and mixtures thereof. The chelants can be provided in the composition in an amount sufficient or effective to stabilize the corrosion inhibitor components.

Chelants include, for example, sodium gluconate, pentasodium salt of diethylenetriamine pentaacetic acid (available under the name Versenex 80), sodium glucoheptonate, ethylene diamine tetraacetic acid (EDTA), salts of ethylene diamine tetraacetic acid, hydroxyethyl ethylene diamine triacetic acid (HEDTA), salts of hydroxyethyl ethylene diamine triacetic acid, nitrilotriacetic acid (NTA), salts of nitrilotriacetic acid, diethanolglycine sodium salt (DEG), ethanoldiglycine disodium salt (EDG), and mixtures thereof and the like. Exemplary salts of ethylene diamine tetraacetic acid include disodium salts, tetrasodium salts, diammonium salts, and trisodium salts. An exemplary salt of hydroxyethyl ethylene diamine triacetic acid is the trisodium salt.

Examples of acid chelants include, but are not limited to, citric acid; propionic acid; gluconic acid; glycolic acid; glucoheptanoic acid; succinic acid; lactic acid; methyllactic acid; 2-hydroxybutanoic acid; mandelic acid; atrolactic acid; phenyllactic acid; glyeric acid; 2,3,4-trihydroxybutanoic acid; alpha hydroxylauric acid; benzillic acid; isocitric acid; citramalic acid; agaricic acid; quinic acid; uronic acids, including glucuronic acid, glucuronolactonic acid, galaturonic acid, and galacturonolactonic acid; hydroxypyruvic acid; ascorbic acid; and tropic acid. Salts of such acids may be useful as chelants.

Care is to be exercised in choosing a chelant for use in the present compositions. Some chelants, such as citric acid, may be aggressive towards metals, such as iron, and may become corrosive when used.

In one example, the present compositions are free or substantially free of chelant components which have one or more detrimental effects, for example, are aggressive toward, for example, may cause unacceptable corrosion and/or other deterioration, of one or more components, e.g., metal components, in a system in which a composition including such a chelant component is used.

The present compositions are particularly well-suited for use in antifreeze coolant formulations for use in internal combustion engines.

In one example, the liquid freezing point depressant comprises at least one alcohol. Suitable alcohols, for example, liquid alcohols, for use in the present freezing point depressants include any alcohol effective as a freezing point depressant. Among the useful alcohols are those selected from the group consisting of methanol, ethanol, propanol, ethylene glycol, diethylene glycol, triethylene glycol, propylene glycol, dipropylene glycol, butylene glycol, glycerol, the monethylether of glycerol, the dimethylether of glycerol, alkoxy alkanols (such as, for example, methoxyethanol and the like) and mixtures thereof.

Examples of highly useful alcohols are those selected from the group consisting of ethylene glycol, diethylene glycol, propylene glycol, dipropylene glycol and mixtures thereof.

Methods of making or producing antifreeze compositions are provided in accordance with the present invention. In one example, the individual components of the present compositions are selected. Such components are combined, for example, added together one at a time or in any other convenient manner. The resulting combination of components may be mixed to obtain a uniform final composition.

The present invention also provides methods for inhibiting corrosion of metal components in internal combustion engines. Such methods may comprise contacting the metals to be protected, against corrosion, with an antifreeze composition and/or coolant composition, as described elsewhere herein.

The present invention further provides methods of cooling industrial processes having a cooling system employing a liquid coolant. Such methods may comprise employing a composition, for example, a corrosion-inhibited composition, in accordance with the present invention as the liquid coolant in the cooling system.

The present invention still further provides methods of transferring heat in a system, for example, a solar energy system, employing a liquid to transfer heat. Such methods may comprise employing a composition, for example, a corrosion-inhibited composition, in accordance with the present invention, as the liquid.

The following non-limiting examples are provided to illustrate certain aspects and features of the present invention.

Examples 1 and 2

Two different corrosion inhibited compositions were prepared. The components of these formulations are described in Table 1 below. These compositions are prepared by first placing the liquid component (water and ethylene glycol) in a vessel equipped with a mixer. The other ingredients are added to the vessel, with stirring (mixing), at room temperature (about 22° C.).

In each of the two Examples, a liquid solution is obtained.

TABLE 1

| Component | Composition 1 (Heavy Duty) | Composition 2 (Light Duty) |
| --- | --- | --- |
| Water | Balance to 100% | Balance to 100% |

TABLE 1-continued

| Component | Composition 1 (Heavy Duty) | Composition 2 (Light Duty) |
|---|---|---|
| Ethylene glycol, % by weight | 50 | 50 |
| Potassium Hydroxide, % by weight | 1.9 | 0.8 |
| t-Butyl Benzoic Acid, mg/l | 25,000 | 18,000 |
| Pimelic acid, mg/l | 100 | 50 |
| Suberic acid, mg/l | 100 | 50 |
| Azelaic acid, mg/l | 10,000 | 5000 |
| Sebacic acid, mg/l | 150 | 75 |
| Undecanedioic acid, mg/l | 400 | 200 |
| Benzotriazole, mg/l | 1500 | 750 |
| $Na_2MoO_4$, mg/l | 1500 | 750 |
| $NaNO_3$, mg/l | 1000 | 500 |
| Scale inhibitor, mg/l | 150 | 75 |
| Defoamer, mg/l | 65 | 65 |

Composition 1 is identified as Heavy Duty, while Composition 2 is identified as Light Duty. Thus, Composition 1 is useful as an antifreeze/coolant composition in heavy duty diesel engine applications such as large (heavy) trucks/engines and in other large (heavy) applications. For example, Composition 1 may be useful; in providing a heavy duty engine coolant, for example, an ASTM D-6210 engine coolant.

Composition 2 is useful as an antifreeze/coolant composition in light duty applications such as automobiles, small (light) trucks and in other relatively small (light) applications. For example, Composition 2 may be useful in providing a light duty ASTM D3306 engine coolant.

Composition 1 was tested with polymeric specimens to determine the effects on (changes in) durometer, tensile strength, elongation and volume (change) of each of the polymers caused by immersion of a polymeric specimen in the composition for 168 hours at 212° F. Such tests were conducted in accordance with ASTM D471-12a.

Specimens of four different polymeric materials were tested in this manner. These polymeric materials were Nitrile Sulfur Cured (NBR-1); NBR HNBR, VMQ (Silicone) and FKM (Viton).

HNBR—hydrogenated nitrile-butadiene-rubber
NBR-1—a specific type of sulfur cured nitrile rubber (Acrylonitrile-butadiene copolymer)
VMQ1—a type of silicone rubber (polydimethylsiloxane)
FKM—a class of fluorine-containing polymers containing vinylidene fluoride as monomer All of these tests using Composition 1 resulted in Composition 1 passing the limits set by Detroit Diesel Engine Company in specification 93K217 and using ASTM D-471-12 methodology.

That is, changes in the durometer, tensile strength, elongation and volume of each of the polymeric specimens as the result of immersion of the specimen in Composition 1 was within the acceptable range using ASTM D471-12a.

Since Composition 1 included higher concentrations of acids and other components relative to Composition 2, it is believed that running all the above-noted tests using Composition 2 would result in Composition 2 passing all the tests.

The heavy duty engine coolant (Composition 1), which is preferably nitrite ($NO_2$) free, provides beneficial cylinder liner cavitation and pitting corrosion inhibition, as shown in testing according to ASTM D-7583, which is the standard test method for the John Deere Coolant Cavitation Test.

Such results demonstrate that the present compositions are compatible with, or not aggressive toward, polymeric, or elastomeric, components of cooling systems in which the compositions are employed.

Similar tests using other compositions including $C_8$ aliphatic monobasic acids, such as 2-ethyl hexanoic acid, caused unacceptable results, for example, unacceptable changes in the durometer of silicone polymeric specimens.

These results indicate that the present compositions are more compatible with, or less aggressive to, polymeric, or elastomeric components of cooling systems in which the present compositions are employed relative to a composition including a $C_8$-$C_{12}$ aliphatic monobasic acid. In other words, the present compositions are advantageously substantially free of one or more $C_8$-$C_{12}$ aliphatic monobasic acids.

All of the components identified in the Examples can be obtained commercially.

One skilled in the art will appreciate that the present invention can be practiced by other than the above-described embodiments, which are presented herein for the purpose of illustration and not of limitation, and that the present invention is limited only by the claims that follow.

Each and every publication, patent and published patent application cited herein is individually incorporated herein by reference in its entirety.

While this invention has been described with respect to various specific examples and embodiments, it is to be understood that the invention is not limited thereto and that it can be variously practiced within the scope of the following claims. For example, any feature disclosed herein may be combined with any other component or feature and will be deemed to fall within the description of this patent application.

What is claimed is:

1. A corrosion-inhibited composition comprising:
  a major amount of a liquid component selected from the group consisting of water, at least one freezing point depressant and mixtures thereof;
  a t-butyl benzoic acid component in an amount in a range of about 1000 to about 35000 mg per liter of the composition;
  a mixture of dicarboxylic acids comprising adipic acid, azelaic acid, sebacic acid, seberic acid, pimelic acid, and undecanoic acid, wherein the azelaic acid is present in an amount in a range of about 500 to about 12,500 mg per liter of the composition; and
  an aromatic triazole component in an amount in a range of about 100 to about 3500 mg per liter of the composition; and
  free of a $C_8$-$C_{12}$ aliphatic monobasic acid;
  wherein the composition causes less change in durometer, tensile strength, elongation and/or volume in at least one polymeric component of a cooling system in which the composition is employed relative to a reference composition which includes the $C_8$-$C_{12}$ aliphatic monobasic acid 2-ethyl hexanoic acid.

2. The composition of claim 1 which further comprises at least one additional $C_6$-$C_{12}$ hydrocarbonyl dibasic acid component present in an amount less than the amount of the azelaic acid component.

3. The composition of claim 2, wherein the additional $C_6$-$C_{12}$ hydrocarbonyl dibasic acid component is selected from the group consisting of pimelic acid, adipic acid, suberic acid, sebacic acid, undecanedioic acid, dodecanedioic acid and mixtures thereof.

4. The composition of claim 1, wherein the aromatic triazole component is selected from the group consisting of benzotriazole, mercaptobenzothiazole, tolyltriazole and mixtures thereof.

5. The composition of claim 1, wherein the aromatic triazole component is benzotriazole.

6. The composition of claim 1, which further comprises an effective amount of at least one metal-containing inhibitor component.

7. The composition of claim 6, wherein the at least one metal-containing inhibitor component is selected from the group consisting of $Na_2MoO_4$, $NaNO_3$ and mixtures thereof.

8. The composition of claim 1, which further comprises at least one additional component selected from the group consisting of surfactant components, deformer components, dye components, scale inhibitor components and mixtures thereof.

9. The composition of claim 1, which further comprises an effective amount of at least one surfactant component.

10. The composition of claim 1, which further comprises an effective amount of at least one scale inhibitor component.

11. The composition of claim 1, wherein the composition is free of both a $C_8$-$C_{12}$ aliphatic monobasic acid and an alkali metal, ammonium, or amine salt thereof.

12. The composition of claim 1, wherein when the composition is included in a coolant in a cooling system, the coolant exhibits improved clarity, or, reduced turbidity, relative to a reference coolant which is the composition including a $C_6$-$C_{12}$ aliphatic monobasic acid.

13. The composition of claim 1, wherein the t-butyl benzoic acid component is selected from the group consisting of t-butyl benzoic acid, alkali metal salts thereof, ammonium salts thereof, amine salts thereof and mixtures thereof.

14. The composition of claim 1, wherein the azelaic acid component is selected from the group consisting of azelaic acid, alkali metal salts thereof, ammonium salts thereof, amine salts thereof and mixtures thereof.

15. The composition of claim 1, which causes no deleterious change in durometer, tensile strength, elongation and/or volume in hydrocarbon-containing elastomers and/or silicone-containing elastomers used in at least one component of a cooling system when such an elastomer is in sustained contact with the composition.

16. The composition of claim 1, which causes less change in durometer, tensile strength, elongation and/or volume in hydrocarbon-containing elastomers and silicone-containing elastomers used in at least one component of a cooling system when such an elastomer is in sustained contact with the composition relative to a substantially identical composition including, in addition, at least 100 mg per liter percent by weight of a $C_8$-$C_{12}$ aliphatic monobasic acid or the alkali metal, ammonium or amine salt thereof.

17. A method of cooling an internal combustion engine having a cooling system, the method comprising employing a corrosion-inhibited composition of claim 1 in the cooling system of the internal combustion engine.

18. A method of cooling an industrial process having a cooling system employing a liquid coolant, the method comprising employing a corrosion-inhibited composition of claim 1 as the liquid coolant in the cooling system.

19. A method of transferring heat in a solar energy system employing a liquid to transfer heat, the method comprising employing a corrosion-inhibited composition of claim 1 as the liquid.

20. A corrosion-inhibited composition comprising:
at least 50% by weight of a liquid component comprising water and/or a freezing point depressant component comprising at least one alcohol selected from the group consisting of methanol, ethanol, propanol, ethylene glycol, diethylene glycol, trimethylene glycol, propylene glycol, dipropylene glycol, butylene glycol, glycerol, the monoethylether of glycerol, the dimethylether of glycerol, alkoxy alkanols, and mixtures thereof;
a t-butyl benzoic acid component in an amount in a range of about 1000 to about 35000 mg per liter of the composition;
a $C_6$-$C_{12}$ hydrocarbonyl dibasic acid component in an amount in a range of about 500 to about 12,500 mg per liter of the composition, said dibasic acid component comprising adipic acid, azelaic acid, sebacic acid, seberic acid, pimelic acid, and undecanoic acid; and
an aromatic triazole component, selected from the group consisting of benzotriazole, mercaptobenzothiazole, tolyltriazole and mixtures thereof, in an amount in a range of about 100 to about 3500 mg per liter of the composition;
at least one metal-containing inhibitor component is selected from the group consisting of $Na_2MoO_4$, $NaNO_3$ and mixtures thereof;
at least one additional component selected from the group consisting of surfactant components, deformer components, dye components, scale inhibitor components and mixtures thereof; and
said corrosion-inhibited composition lacking a $C_8$-$C_{12}$ aliphatic monobasic acid; and
wherein said corrosion inhibiting composition causes less change in durometer, tensile strength, elongation and/or volume in at least one polymeric component of a cooling system in which the composition is employed relative to an otherwise substantially identical composition which includes at least 100 mg per liter of a $C_8$-$C_{12}$ aliphatic monobasic acid selected from the group consisting of neodecanoic acid, 2-ethyl hexanoic acid and the alkali metal, ammonium or amine salt thereof.

* * * * *